Sept. 21, 1954 P. R. SCHROEPPEL 2,689,440
TRAILING CROP HARVESTING HITCH DEVICE
Filed Sept. 4, 1948 6 Sheets-Sheet 1

INVENTOR.
Paul R. Schroeppel.
BY
Thiess, Olson & Mechlenburger.

Sept. 21, 1954  P. R. SCHROEPPEL  2,689,440
TRAILING CROP HARVESTING HITCH DEVICE
Filed Sept. 4, 1948  6 Sheets-Sheet 4

INVENTOR.
Paul R. Schroeppel.
BY
Thiess, Olson & Mecklenburger
Attys.

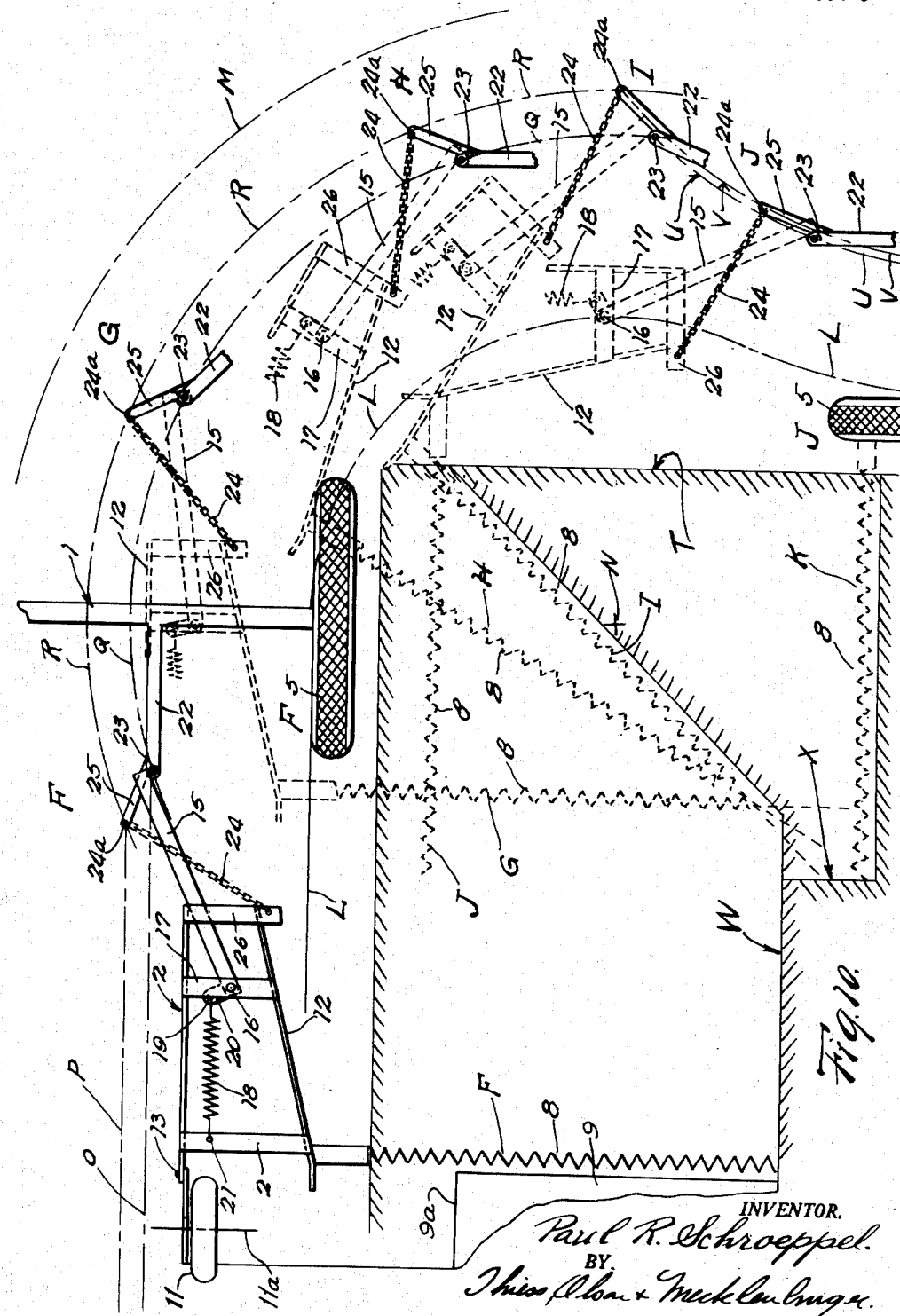

Patented Sept. 21, 1954

2,689,440

UNITED STATES PATENT OFFICE 2,689,440

TRAILING CROP HARVESTING HITCH DEVICE

Paul R. Schroeppel, Rockford, Ill., assignor to J. I. Case Company, Racine, Wis., a corporation of Wisconsin Application September 4, 1948, Serial No. 47,793

1 Claim. (Cl. 56—25)

My invention relates to harvester hitches.

One of the objects of my invention is to provide a harvester hitch for connecting a harvester and tractor by means of which the corners of the uncut area may be maintained substantially rectangular notwithstanding that the tractor must travel in an arcuate or curved path in making the turn.

A further object is to provide an improved power take-off between a tractor and the harvester drawn thereby which will avoid excessive angularity between the sections of shafting when making turns.

A further object is to provide improved power means for adjusting the height of cut of the harvester.

Further objects and advantages of the invention will be apparent from the description and claim.

In the drawings, in which an embodiment of my invention is shown,

Fig. 7 is an enlarged elevational perspective view showing a manual adjustment for height of cut, substituted for the power ram shown in Figs. 4, 5 and 6;

Fig. 8 is an enlarged plan view showing various positions of the tractor and windrower hitch and the drawbar connection between them, showing the tractor making a right-hand turn;

Fig. 9 is a view similar to Fig. 8 but showing the position of parts when the tractor is making a left-hand turn;

Figure 11:
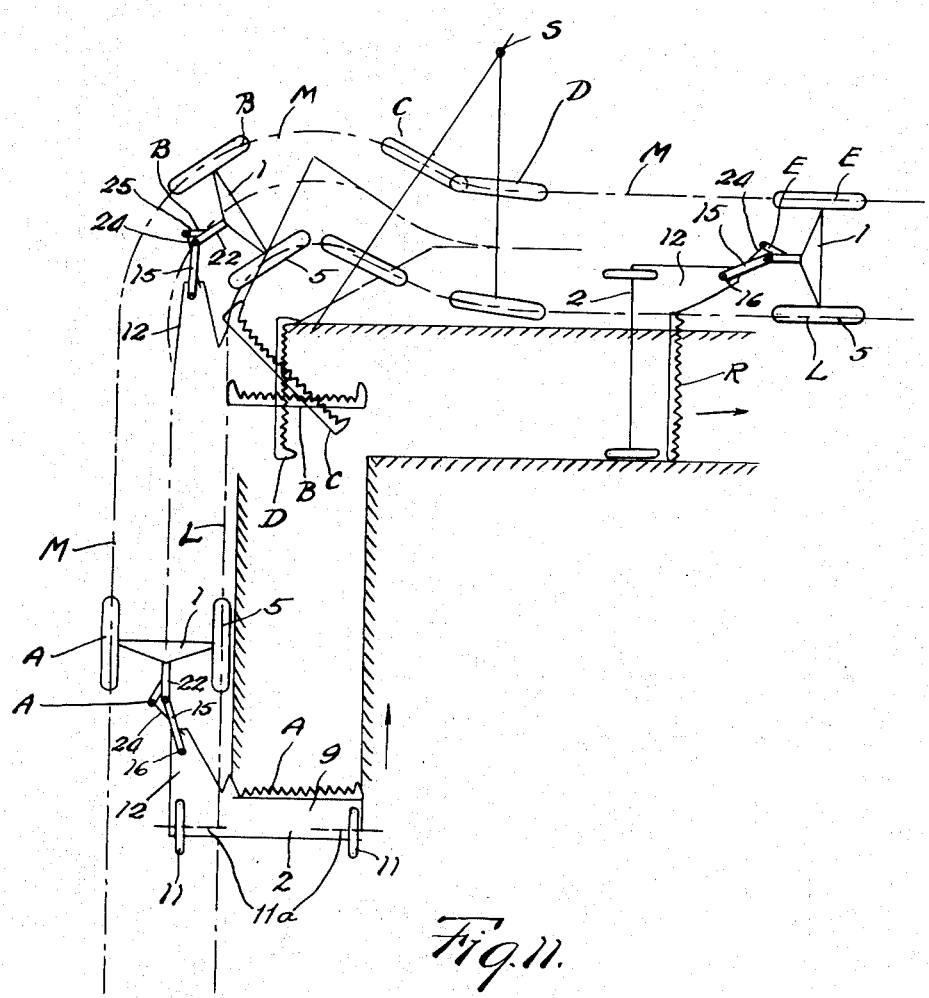

Fig. 10 is a diagrammatic plan view showing the various positions which the parts of the tractor and windrower assume when the windrower is cutting a sharp corner and the tractor is accordingly making a sharp turn, one of the windrower wheels being removed; and Fig. 11 is a diagrammatic plan view, in general similar to Fig. 10, but showing the parts on a reduced scale in order to bring in a larger portion of the field.

Referring to the drawings, the construction shown comprises a tractor 1 and a windrower 2 drawn thereby. The tractor comprises a chassis 3 provided with front and rear wheels 4 and 5, a seat 5a, a steering wheel 6, an engine for driving the tractor, a draft construction connecting the tractor and windrower, and a power take-off for supplying power from the engine to actuate the reel 7, sickle 8, conveyor 9, etc., of the windrower. The windrower comprises a carriage or chassis 10 provided with a pair of coaxial ground-engaging wheels 11, rotatable about the axis 11a (Figs. 10 and 11), a sickle 8 mounted for reciprocation thereon, a conventional conveyor 9 extending transversely of the line of travel of the windrower for receiving cut material and delivering it in windrow form at the end 9a of the conveyor remote from the standing grain, and a reel 7 for bending the stalks of grain toward the sickle and sweeping the cut grain onto the conveyor. A draft construction is provided for connecting the windrower to the tractor in a manner to enable relatively short, substantially rectangular turns of the windrower.

The transmission from the power take-off on the tractor to the driven mechanisms carried by the windrower includes universal-joint-connected shaft sections designed to prevent excessive angular displacement of the sections with respect to each other in making the short turns. The draft connections between the windrower and tractor comprise a truss-like hitch or tongue 12 rockably connected at 13 to forwardly-extending arms 14 rigid with respect to the windrower chassis 10, a drawbar 15 pivotally connected at 16 to swing about a vertical axis on a crossbar 17 of the windrower hitch, a coil tension spring 18 connected at 19 with a lateral arm 20 on the hitch drawbar 15 and connected at 21 with the windrower hitch 12 for biasing and urging the pivoted drawbar 15 to its extreme left-hand position, a tractor hitch 22 pivotally adjustable to different settable positions about a vertical axis, as at 22' shown in Fig. 2, on the tractor and pivotally connected at 23 to the drawbar 15, and a chain 24 having one end secured at 24ª to the rearward lateral extension 25 of the tractor hitch 22 and its other end connected at 25ª with a crossbar 26 on the windrower hitch 12.

Figure 3:
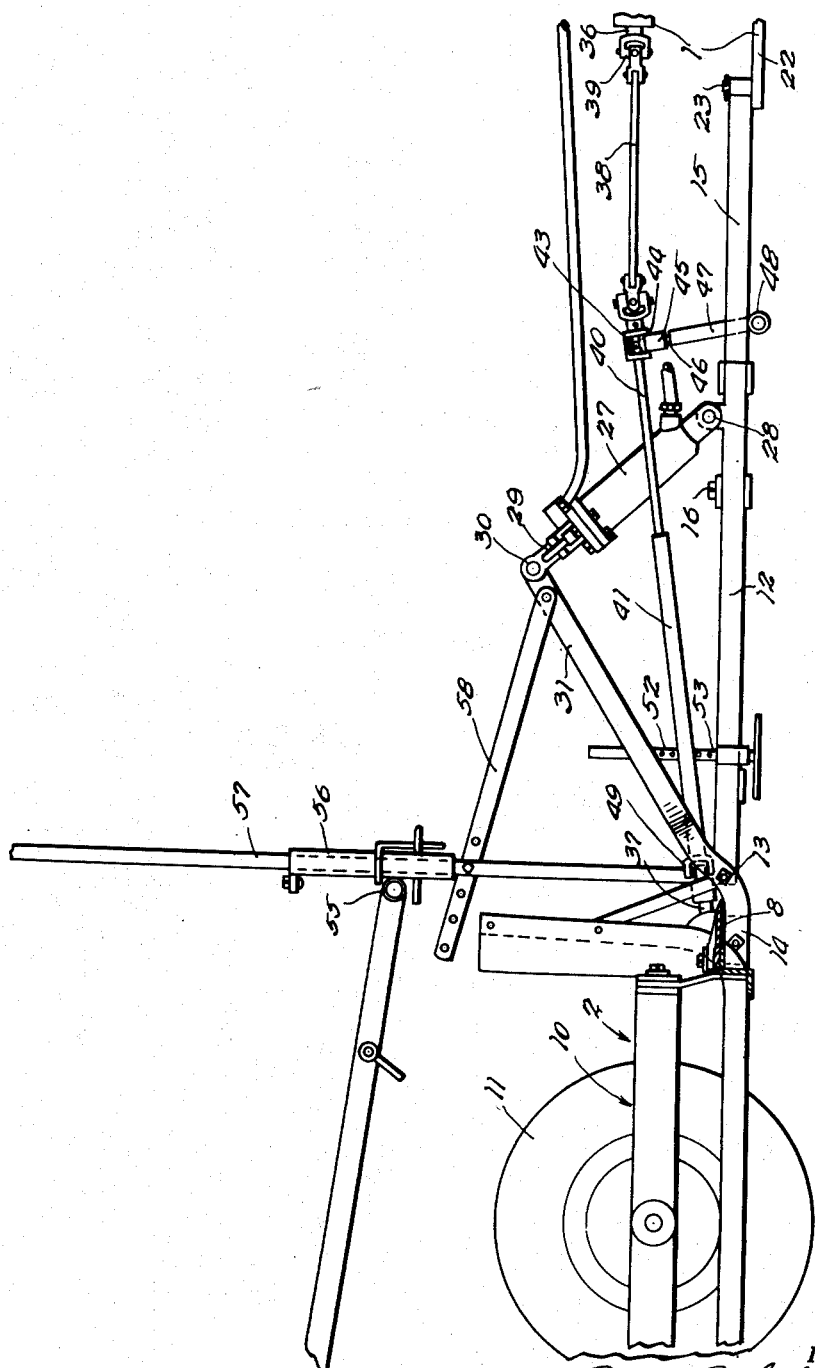
Fig. 3 is a side elevational view showing the rear end of the tractor and the front end of the windrower and the connections therebetween, the tractor being shown as travelling straight ahead.

Means are provided which may be either power means or manually operated means for adjusting the connections between the tractor and windrower to vary the height of the cut of the sickle 8 and also to facilitate the connection and disconnection of the windrower with respect to the tractor drawbar 22. The power means shown comprises a hydraulic ram having a cylinder 27 rockably mounted at 28 on the hitch 12 and a piston operating in the cylinder 27 having a piston rod 29 pivotally connected at 30 with the forward portion of one of the arms 14 of the windrower, varying its angular relation to the hitch 12 and drawbar 15. As shown in Fig. 3, varying the angular relation of the arm portion 31 with respect to the hitch 12 and drawbar 15 causes raising or lowering of the sickle 8. The manner in which the ability to vary this angular relation facilitates the connection and disconnection of the windrower with respect to the tractor and drawbar 22 is described later in connection with the adjustable stand 52 shown in Figs. 4, 5 and 6.

The manually operable means which may be substituted for the above-described power means comprise a lever 32 which may be rigidly secured with respect to the arm portion 31 of the windrower, the operating handle 33 of which projects to a position in which it may be readily grasped by the driver sitting in the tractor seat 5ª, and a quadrant 34 mounted on the grain side leg of the hitch 12 and cooperating with the adjusting lever 32 which has a latch 35 which may engage and be secured in any one of the notches on the quadrant 34.

Figure 1:
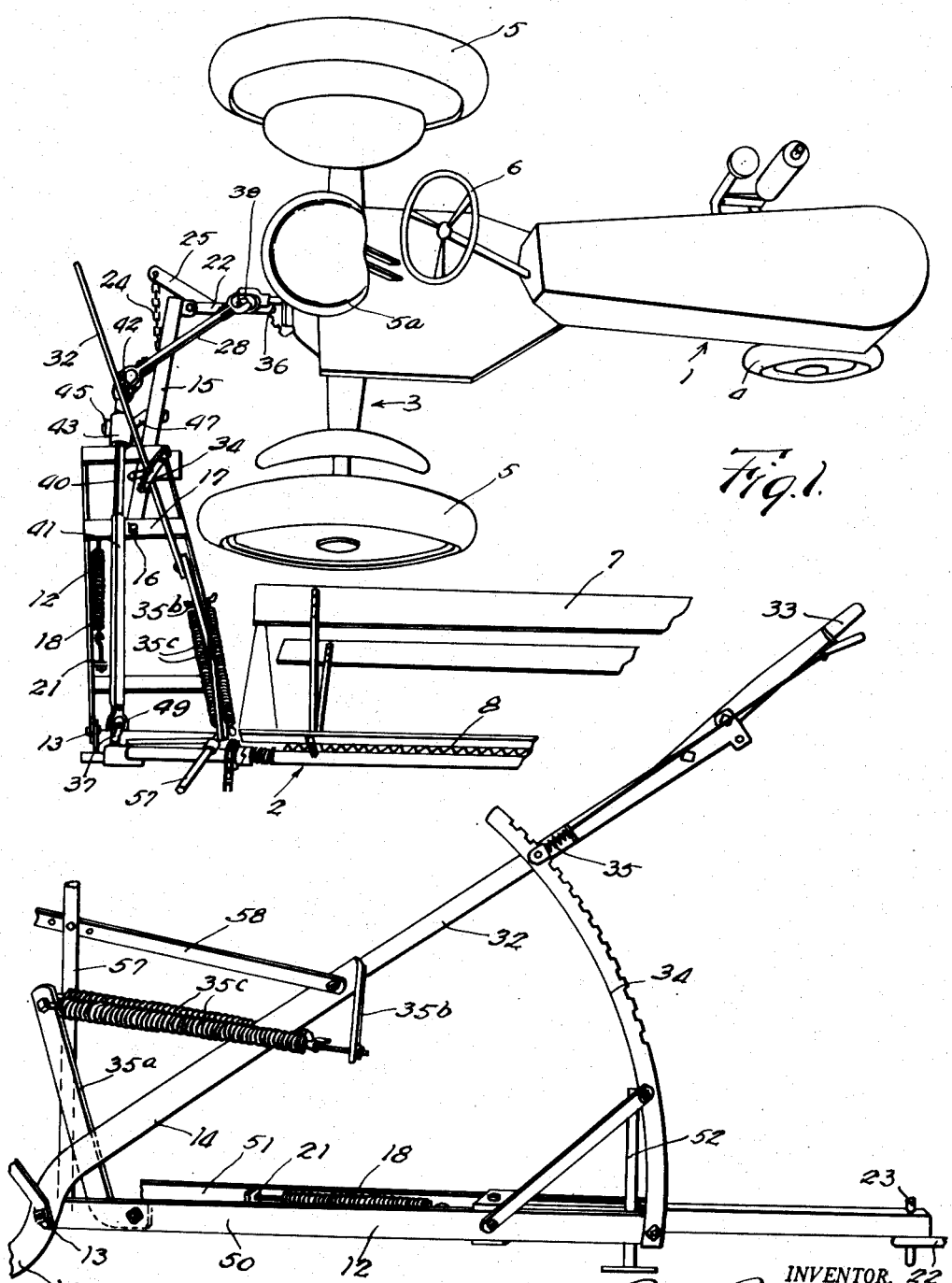
Figure 1 is a perspective plan view showing a tractor, portions of a windrower, a drawbar, and power connections between the tractor and windrower, the tractor being shown as having made a sharp turn.
Figure 2:
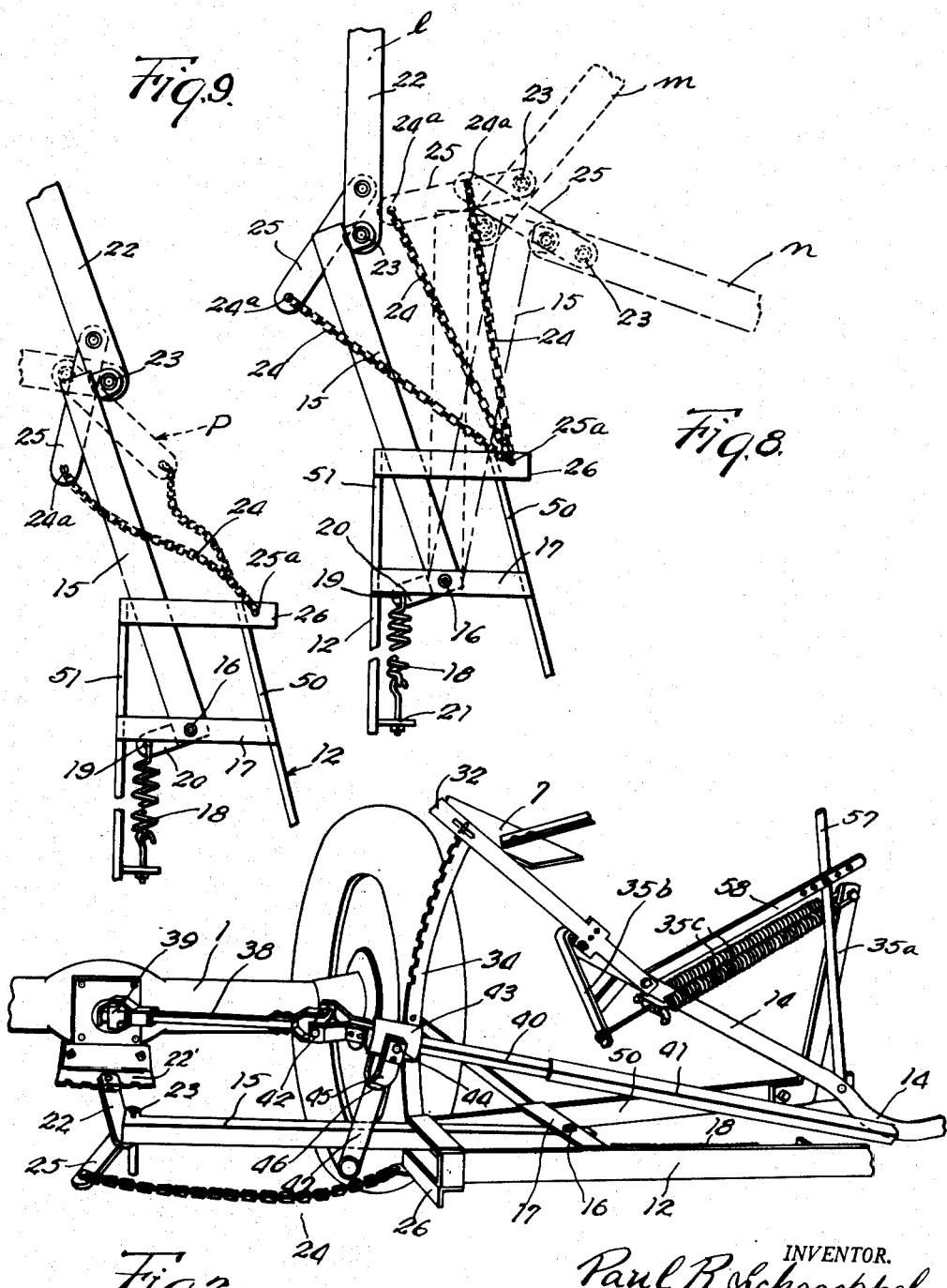
Fig. 2 is a rear elevational perspective view showing the rear end of a tractor and the front end of the windrower, with connections therebetween, the relative positions corresponding substantially to those shown in Fig. 1.

Referring to Figs. 2, 3 and 7, in making the substitution, the ram 27 and associated parts shown in Fig. 3 are removed, an arm 35ª is secured to one of the bars of the windrower hitch 12, an anchorage bracket 35ᵇ is secured to the arm 14, and a pair of tension springs 35ᶜ are connected between the arm 35ª and the bracket. This spring arrangement will tend to draw the arms 35ª and 14 toward each other with a scissors action about the pivotal point 13. This tendency to bring the arms 14 and 35ª together will tend to raise the pivotal point 13 and will thus assist the operator in raising the sickle 8 by means of the handle 33.

The universal joint connected shaft section transmission between the power take-off 36 on the tractor and the windrower mounted shaft 37 which drives the sickle 8, reel 7, and conveyor 9 of the windrower comprises a shaft section 38 having a universal joint connection 39 with the power take-off shaft, a telescoping shaft having two squared telescoping sections 40 and 41, one of which is connected with the shaft 38 by means of a universal joint 42 and which is mounted in a bearing 43 trunnioned at 44 on a yoke 45 which is swively mounted at 46 in a rock arm 47 which is rockable on a trunnion 48 on the swingable drawbar 15, and a universal joint connection 49 between the hollow squared shaft section 41 and the shaft 37 which drives the mechanisms on the windrower.

Before describing in further detail the construction, a brief description of the operation of handling the apparatus in going around a field of grain having a rectangular corner will be described. This operation is shown diagrammatically in Figs. 10 and 11. Successive positions occupied by certain portions of the tractor and windrower, for example, the tractor wheels 5, hitch extension 25, and the windrower sickle 8, are shown at A, B, C, D, E in Fig. 11 and at F, G, H, I, J and K in Fig. 10. The paths of the two rear wheels 5 of the tractor are indicated in fine dot-and-dash lines at L and M. As indicated, the grainward rear tractor wheel 5 travels close to the edge of the standing grain in moving up to position F of Fig. 10. At this point the operator turns the tractor sharply clockwise as viewed in plan, causing the rear tractor wheels to follow the arcuate portions of the paths L and M, the tractor in effect swinging about the point N as a center. Up to this point of turning the pivotal point 23 and the connecting point 24ª have been travelling in straight lines parallel to the edge of the uncut grain as indicated at O and P. As soon as the tractor begins to swing about the center N, the points 23 and 24ª will begin to move in the circular arcuate paths Q and R until they have arrived at position I. At this point the operator quickly changes the direction of curvature of the wheel paths, causing the tractor to swing counterclockwise about the center S indicated in Fig. 11. The points 23 and 24ª are thus constrained to move in arcuate paths U and V, breaking sharply from the arcs Q and R which they had been travelling. This counterclockwise swing is continued until the rear tractor wheels 5 are in position J, travelling parallel to the straight boundary line T of the uncut grain. At this point the driver straightens up the steering wheel so as to cause the tractor to travel parallel to the edge of the uncut grain.

As the points 23 and 24ª move from position F to position G, the sickle 8 also will move from position F to position G, travelling substantially straight forwardly and remaining parallel to its original position at F. The substantially straight-forward movement of the sickle, notwithstanding the substantially 30-degree swinging movement of the tractor about the point N, is accounted for by the fact that the points 23 and 24ª are a subsantial distance in the rear of the rear axle 1 of the tractor and also to the fact that the point 24ª is offset to the left of the point 23. As previously stated, this will cause the points 23 and 24ª to travel in the circular paths Q and R, thus arriving at the point shown in position G, which will bring the sickle 8 substantially to the position shown at G. As the movement of the tractor continues progressively to positions H and I, the points 23 and 24ª will occupy the respective positions shown at these points H and I and will exert a pulling action on the chain 24 and drawbar 15 to bring the sickle 8 to the respective positions shown at positions H and I. At position I, the reverse change in curvature takes place so that the points 23 and 24ª will thereafter follow the paths U and V. The effect of this is for the point 24ª to "pay out" on the chain 24, allowing the spring 18 to effect a counterclockwise movement of the sickle 8 about a point adjacent the stubbleward wheel of the windrower which shortly brings the sickle to the position shown at J, in which position the grainward wheel 5 of the tractor is travelling substantially parallel to the edge of the uncut area. At this point the driver straightens up the steering wheel to cause the tractor to travel parallel to the uncut edge T of the grain, causing the sickle to move to the position shown at K. It will be noted that this will leave a substantially rectangular corner of uncut grain as indicated at W and X.

Figs. 8 and 9 show various positions which may be occupied by the windrower hitch 12, tractor hitch 22, drawbar 15, chain 24, and associated elements. Fig. 8 shows in general the positions occupied by the hitch connections in making a right-hand turn. Fig. 9 shows the position occupied by these parts in making a left-hand turn. In Fig. 8, position *l* shows the relative positions of the parts when the tractor is travelling straight ahead. Position *m* shows the relative position of parts when the tractor has been turned to the right to bring the points 23 and 24ª to the position shown. Position *n* shows the relation of parts when the tractor has been swung still further to the right to bring the points 23 and 24ª to the position shown. In position *n* the drawbar 15 has moved to its extreme right-hand position in which it engages the forward end of the bar 50 of the windrower hitch. In position *l* the tension of the spring 18 is such that it will hold the drawbar 15 against the front end of the bar 51 of the hitch 12, or conversely, will hold the front end of the bar 51 against the edge of the drawbar 15.

In Fig. 9 the tractor has been turned to the left to bring the tractor drawbar to the position shown in which the drawbar 15 is in its extreme left-hand position bearing against the front end of the bar 51 of the windrower hitch, and the chain 24 has been slackened by the movement of the point 24ª. When the tractor is turned further to the left to move the tractor drawbar from position *o* to position *p*, the chain 24 will be further slackened and the windrower hitch will be turned further to the left due to the left-hand urge of the tractor hitch 22, on the pivotal connection 23 of the drawbar 15, and the engagement of the drawbar 15 with the front edge of the windrower bar 51, which drawbar 15, in this part of the movement, becomes, in effect a rigid extension of the windrower hitch 12.

Figure 6:
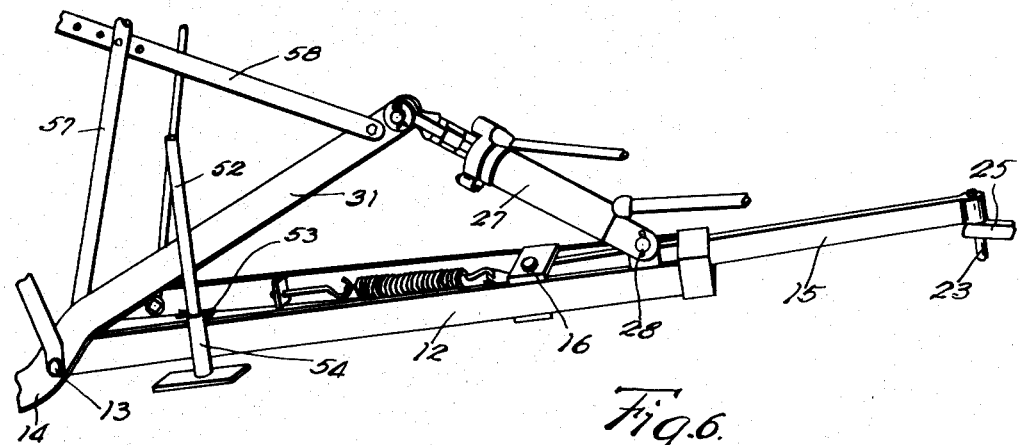
Fig. 6 is a view similar to Fig. 4 but showing the stand in its elevated position and the ram in its collapsed position for effecting a low cut.
Figure 4:
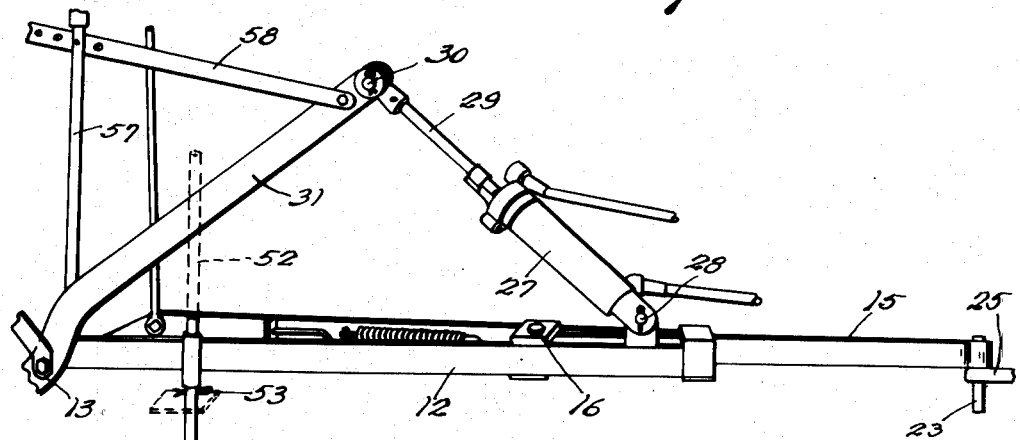
Fig. 4 is an enlarged side elevational perspective view showing the drawbar connected with the rear end of the tractor hitch and showing the ram in extended position.
Figure 5:
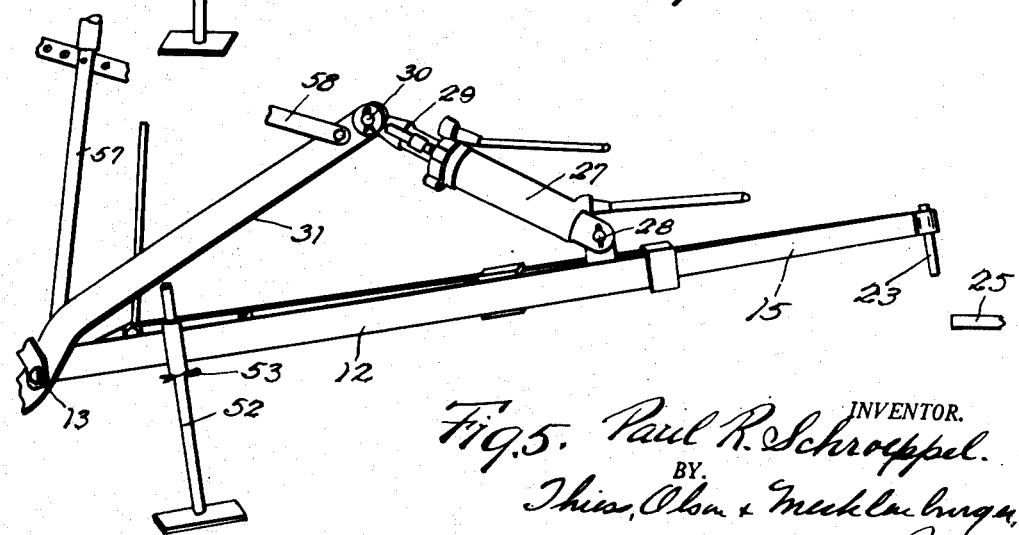
Fig. 5 is a view similar to Fig. 4 but showing the drawbar disconnected from the tractor, the ram being in withdrawn position.

Figs. 4, 5 and 6 show various positions of the hitch and drawbar connections between the tractor hitch extension 25 and the forwardly-extending arms 14 and 31 of the windrower. Fig. 4 shows the drawbar 15 connected with the tractor hitch 25, with the ram 27 in extended position to take the pressure off the adjustable stand 52 so that it can, if desired, be moved to its lowermost position for engagement with the ground and secured in this position by means of a cotter pin 53. Thereupon by collapsing the ram the parts may be brought to the position shown in Fig. 5, in which the forward end of the drawbar 15 will be elevated to move the pin 23 out of engagement with the tractor hitch 25, the weight and distribution of the windrower being such as to dip the left-hand end of the windrower hitch 12 at 13 about the stand 52 as a fulcrum, thus elevating the right-hand end of the drawbar 15.

Going back to the position shown in Fig. 4, the parts may be brought to this position by extending the ram 27. If, with parts in the position shown in Fig. 4, it is desirable to start field operations, the stand 52 is raised to its dotted-line position and the desired height of cut can then be secured by proper manipulation of the ram. Fig. 4 shows the ram in fully-extended position which would cause the windrower to cut at its maximum height.

Fig. 6 shows the stand 52 raised and held up by the cotter pin 53 inserted through the stand 52 above the sleeve 54 and the ram completely collapsed, which sets the sickle in its lowermost position. By proper manipulation of the ram, the sickle position may be set at any desired point between the extreme upper and lower positions.

The windrower reel 7 which forms no part of the present invention is rotatably mounted in a bearing bracket 55 which includes a sleeve 56 vertically adjustable on a post 57 adjustably secured to the windrower by a brace 58 connecting it with the forwardly-extending arm 31.

In order to give an idea as to the proportion of parts, it is stated that in using a tractor with a windrower which cuts a nine-foot swath, it has been found satisfactory to make:

The distance between the points 16 and 23 about 40 inches

The length of the chain which connects the points 24ª and 25ª about 30 inches

The distance between the front ends of the bars 50 and 51 of the windrower hitch about 12 inches The distance from the pivot 16 to the front end of the bar 51 about 16 inches The distance from the pivotal point 16 to the front end of the bar 50 about 15 inches The width of the drawbar 15 about 2½ inches The angle of the extension 25, with respect to the bar 22 about 150 degrees The dimensions shown in the drawings in all of the figures are approximately to scale, although the scales may be different in different figures.

Further modifications will be apparent to those skilled in the art and it is desired, therefore, that the invention be limited only by the scope of the appended claim.

Having thus described my invention, what I claim and desire to secure by Letters Patent is:

A hitch connected between a tractor having a rigid rearwardly extending drawbar and a crop harvesting device characterized by a laterally projecting cutter bar and a pair of coaxial ground engaging wheels for directing the movement of said cutter bar, said hitch comprising a laterally rigid drawbar structure extending forwardly from the crop harvesting device a substantial distance in advance of the axis of said wheels, a tongue pivoted for lateral movement on a forward portion of said rigid drawbar structure and pivotally connected to said tractor drawbar, stops limiting the lateral movement of said tongue, means biasing the tongue against one of said stops, and lost motion unidirectional force transmitting means connected between said tractor drawbar and said laterally rigid drawbar structure to transmit force, upon swinging of said tractor drawbar in one direction so as to tend to swing said tongue, overcoming said biasing means, away from said one stop toward the other stop.

References Cited in the file of this patent

UNITED STATES PATENTS

| Number | Name | Date |
|---|---|---|
| 685,944 | Pridmore | Nov. 5, 1901 |
| 1,632,013 | Trauger | June 14, 1927 |
| 1,822,204 | Coultas | Sept. 8, 1931 |
| 1,921,581 | Paul | Aug. 8, 1933 |
| 1,939,830 | Paul | Dec. 19, 1933 |
| 1,996,611 | Carter | Apr. 2, 1935 |
| 2,240,168 | Adkisson | Apr. 29, 1941 |
| 2,292,627 | Foushee | Aug. 11, 1942 |
| 2,427,824 | Vutz | Sept. 23, 1947 |
| 2,430,143 | Rutter | Nov. 4, 1947 |